No. 12,387. REISSUED AUG. 29, 1905.

T. J. LINDSAY.

SUPPORTING DEVICE FOR SUPERSTRUCTURAL PARTS OF VEHICLES.

APPLICATION FILED MAY 25, 1905.

Witnesses
Adelaide Keane
Frank A. Fahle

Inventor
Thomas J. Lindsay

Bradford & Hood,
Attorneys

UNITED STATES PATENT OFFICE.

THOMAS J. LINDSAY, OF INDIANAPOLIS, INDIANA.

SUPPORTING DEVICE FOR SUPERSTRUCTURAL PARTS OF VEHICLES.

No. 12,387. Specification of Reissued Letters Patent. Reissued Aug. 29, 1905.

Original No. 788,661, dated May 2, 1905. Application for reissue filed May 25, 1905. Serial No. 262,270.

*To all whom it may concern:*

Be it known that I, THOMAS J. LINDSAY, a citizen of the United States, residing at Indianapolis, county of Marion, and State of Indiana, have invented certain new and useful Improvements in Supporting-Devices for Superstructural Parts of Vehicles, of which the following is a specification.

A leading object of my present invention is to produce a neat and efficient supporting device upon which to mount superstructural parts in vehicles, said device being itself mounted upon the axle structure of such vehicle and the construction being such that said device may be attached to the axle structure whether fixedly or pivotally and of such a character that it may be applied to axle structures having enlarged ends.

A further object it to provide an efficient means by which such a device may be securely prevented from slipping longitudinally of the axle structure.

A further object is to produce means by which a suitable brace-rod may be attached directly to such device when desired.

The particular service for which I have especially designed this invention is as a "spring-seat" or seat of support for the springs in motor-vehicles, and the accompanying drawings illustrate a portion of such a vehicle when provided with or including a construction embodying my said invention.

Figure 1:
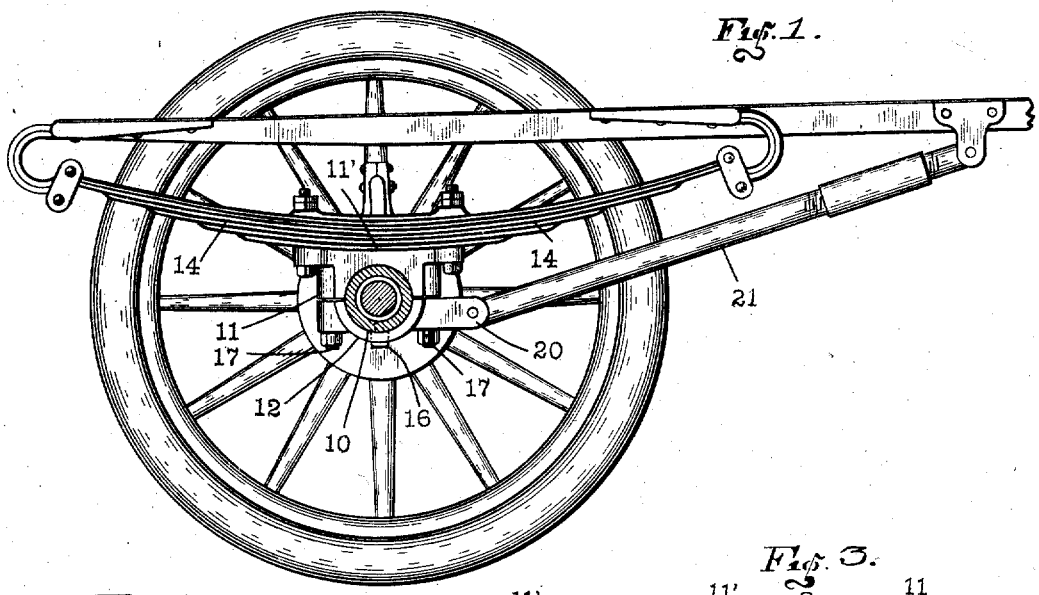
Figure 2:
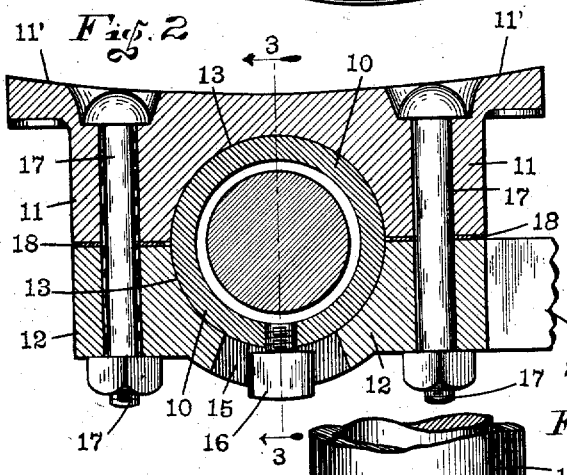
Figure 3:
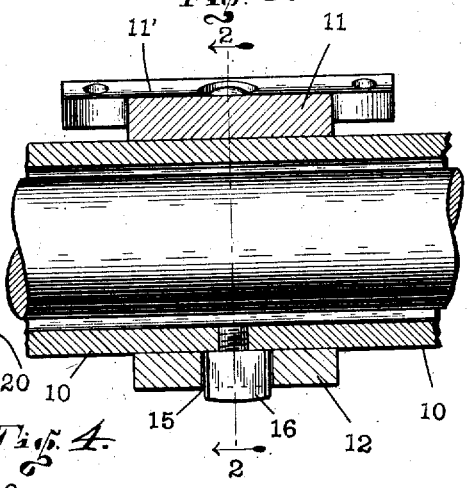
Figure 4:
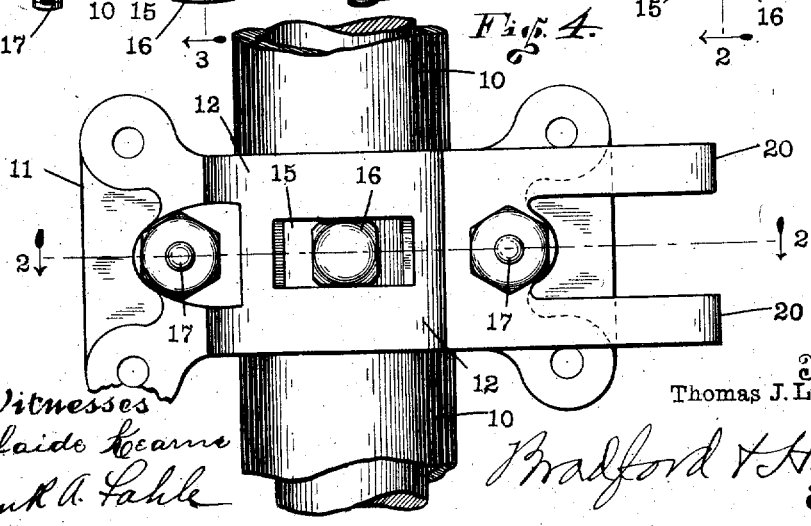

Figure 1 is a view showing such a spring-seat, a spring mounted thereon, and the immediately adjacent parts of the running-gear (including one of the wheels) of a motor-vehicle, the axle structure whereon my improved supporting device or spring-seat is mounted being shown in transverse section; Fig. 2, a transverse vertical sectional view through the device in question and the axle structure when the same are assembled at the point indicated by the dotted line 2 2 in Figs. 3 and 4; Fig. 3, a longitudinal vertical sectional view at the point indicated by the dotted line 3 3 in Fig. 2, and Fig. 4 an under side plan view of the parts illustrated by Figs. 2 and 3.

In the drawings, 10 indicates the rear axle structure, which in the present case is substantially of the character shown and described in my Letters Patent No. 748,760.

The device embodying my present invention is composed of two mating portions 11 and 12, these parts being provided on their adjacent faces with grooves or recesses 13 for the reception of the axle structure 10. In the construction illustrated in the drawings the axle structure is round, in which case the grooves or recesses 13 are substantially semicircular, as shown. The upper side of the portion 11 has a receiving-face 11′, to which any desired superstructural part—such, for instance, as a semi-elliptical leaf-spring 14—is to be attached. The portion 12 is provided with a transverse slot 15, which extends through the wall of said portion and is of such size as to receive the head of a stud 16, which stud is attached to the axle structure 10. The slot 15 is of such size as to permit angular movement of the supporting device on the axle structure 10 when said structure is round in cross-section, but such as to prevent rotative movement of the stud 16, and thus serves as a lock to prevent accidental removal of said stud, which is attached to the axle structure by a screw-threaded engagement, as shown in the drawings. As will be readily understood, this stud serves as a detent by means of which the supporting device is held to a predetermined position longitudinally on the axle structure. When the desired position for said device is ascertained, it is only necessary to form a screw-threaded perforation in the axle structure at that point and insert the screw-threaded point of the stud and afterward attach the two parts of the superstructure-supporting device so that the slot or opening in the adjacent portion thereof will pass over the head of said screw-stud. Said head being of a non-circular form, said screw-stud will be securely prevented from accidental removal and the position of the supporting device on the axle structure therefore made entirely secure. The two parts 11 and 12 are clamped together upon the axle structure by means of bolts 17.

When it is desired that the supporting device be angularly movable upon the axle structure 10, shims 18 are placed between the two portions 11 and 12, so that when the bolts 17 are drawn tight the device will still remain sufficiently loose upon the axle structure to permit angular movement. If a fixedly-positioned device is desired, it is merely necessary to remove the shims, whereupon the bolts 17 will serve to draw the two parts 11 and 12 tightly upon the axle structure. One of the parts 11 or 12, preferably the cap portion 12, is provided with a pair of parallel perforated ears 20, between which may be attached one end of the usual brace-rod 21.

I am aware that spring-seats have been made heretofore of such character that they could be slipped axially over the end of an axle structure and be free to rotate thereon; but in all such cases so far as I am aware the construction is such that it cannot be applied to an axle structure having enlarged ends. In my pending application, Serial No. 249,926, I show a construction in which the tubular axle-sections within which the drive-shaft sections are journaled have swaged outer ends which receive the bearings for the axle-section, and in such construction it is impossible to slip a spring-seat of this character axially onto the axle structure. This illustrates one of the reasons why I have made the supporting device of two mating portions, so that the same may be applied to any desired part of the axle structure. In such construction it is also necessary to provide means by which the position of the supporting device on the axle structure may be fixed longitudinally. By the use of the single screw-stud 16 and the slot 15 I am enabled to accomplish this result with a minimum number of parts, the construction being such, however, that the supporting device may be either pivoted or fixed and also such as to prevent any possibility of longitudinal slipping of the device on the axle structure and to prevent any loosening of the parts by reason of jar. The head of the screw-stud being non-circular in form and the sides of the slot or opening into which it extends approaching closely to one or more of its flattened sides, it obviously cannot turn while the part containing said slot or opening is secured in place, as when the parts are in assembled relation, as shown in the drawings.

Having thus fully described my said invention, what I claim as new, and desire to secure by Letters Patent, is—

1. The combination, in a vehicle, of an axle structure, a superstructure-supporting device adapted to be mounted thereon composed of two parts having mating recesses which bear upon opposite sides of said axle structure, an opening in one of said parts, and a screw-stud engaging with the axle structure and adapted to extend into said opening, said opening and the head of said stud being non-circular whereby unscrewing of said stud is prevented when the parts are assembled.

2. The combination, in a vehicle, of an axle structure, a superstructure-supporting device adapted to be mounted thereon composed of two parts having mating recesses which inclose opposite sides of said axle structure, one of said parts being provided with a non-circular opening, and a screw-stud engaging with the axle structure and provided with a non-circular head adapted to extend into said opening.

3. The combination, in a vehicle, of an axle structure, a superstructure-supporting device adapted to be mounted thereon composed of two parts having mating recesses which bear upon opposite sides of said axle structure, one of said parts having an opening extending through its wall, a stud extending outwardly from said axle structure and engaging with said opening whereby longitudinal movement of the device on the axle structure is prevented, and bolts whereby the two halves of said device are clamped together around said axle structure.

4. A superstructure-supporting device consisting of a pair of separable members provided on their adjacent faces with transverse grooves adapted to receive a round axle structure, one of said parts being provided with a superstructure-receiving portion, and one of said parts being provided with a slot communicating with the transverse axle-receiving groove and adapted to receive a pin carried by the axle structure; and means for clamping the two parts of the device upon the axle structure.

5. A superstructure-supporting device consisting of a pair of separable members provided on their adjacent faces with transverse grooves adapted to receive a round axle structure, one of said parts being provided with a superstructure-receiving portion, one of said parts being provided with a slot communicating with the transverse axle-receiving groove adapted to receive a pin carried by the axle structure, and one of said parts being provided with a transversely-extending ear to which a brace-rod may be attached; and means for clamping the two parts of the device upon the axle structure.

In witness whereof I hereunto set my hand and seal, at Indianapolis, Indiana, this 23d day of May, 1905.

THOMAS J. LINDSAY. [L. S.]

Witnesses:

CHESTER BRADFORD,
JAMES A. WALSH.